(12) United States Patent
Pierman et al.

(10) Patent No.: US 6,672,609 B2
(45) Date of Patent: Jan. 6, 2004

(54) TOW HOOKS

(75) Inventors: Richard F. Pierman, deceased, late of Northville, MI (US), by Laura Pierman, legal representative; Venkata Subramanian Balanethiram, Troy, MI (US); Mohammad Zaheer Younus, Canton, MI (US)

(73) Assignee: Oxford Suspension, Inc., Troy, MI (US)

( * ) Notice: Subject to any disclaimer, the term of this patent is extended or adjusted under 35 U.S.C. 154(b) by 42 days.

(21) Appl. No.: 10/008,200

(22) Filed: Dec. 6, 2001

(65) Prior Publication Data

US 2002/0105163 A1 Aug. 8, 2002

Related U.S. Application Data

(60) Provisional application No. 60/251,645, filed on Dec. 6, 2000.

(51) Int. Cl.[7] .................................................. B60D 1/99
(52) U.S. Cl. ...................................................... 280/504
(58) Field of Search ......................... 280/504; 248/200, 248/300, 315

(56) References Cited

U.S. PATENT DOCUMENTS

| | | | | |
|---|---|---|---|---|
| 1,702,830 A | * | 2/1929 | Jordan | 280/504 |
| 2,392,368 A | * | 1/1946 | Dilbert | 280/504 |
| 2,993,710 A | * | 7/1961 | Sichman | 280/504 |
| 3,170,718 A | * | 2/1965 | Strom | 280/504 |
| 3,741,599 A | | 6/1973 | Drayton | 294/82 |
| D245,832 S | | 9/1977 | Fredriksson | D8/367 |
| 5,054,806 A | | 10/1991 | Chester | 280/495 |
| 5,716,066 A | | 2/1998 | Chou et al. | 280/501 |

* cited by examiner

*Primary Examiner*—Lesley D. Morris
*Assistant Examiner*—L. Lum
(74) *Attorney, Agent, or Firm*—DykemaGossett PLLC

(57) ABSTRACT

A lightweight, high-strength tow hook is provided. The tow hook includes a first member provided by an elongated strip of metal formed generally into a U-shape with a hooked end with two extending arms. The first member has a cross-sectional shape with a base and in a preferred embodiment has two extending cross-sectional legs which extend outwardly. A second member is provided forming a mounting bracket having a main body for connection to an automotive vehicle. The second member also has connected with the main body two connected lateral flanges. The flanges are connected with the first member extending arms. A third member is connected to the second member spanning the lateral flanges of the second member generally opposite the second member main body.

29 Claims, 3 Drawing Sheets

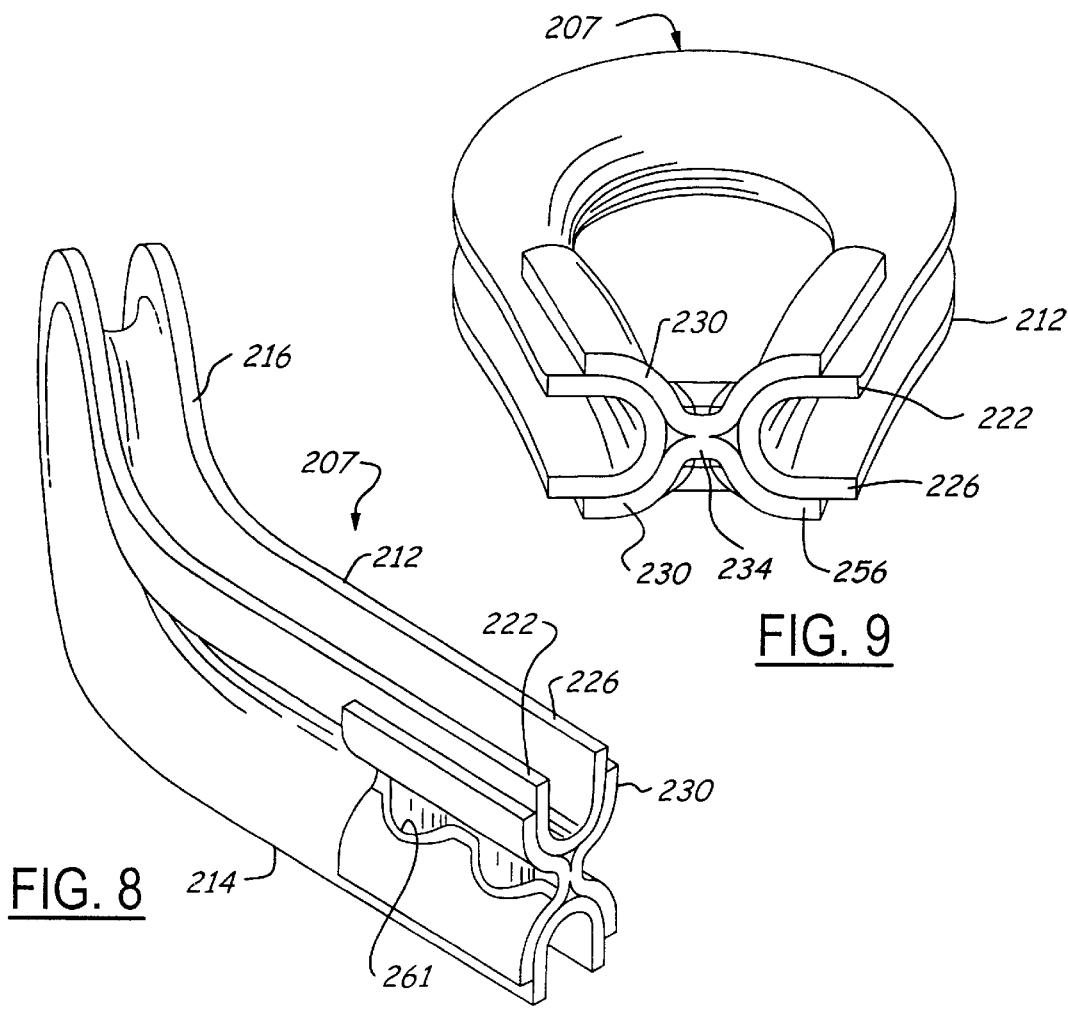
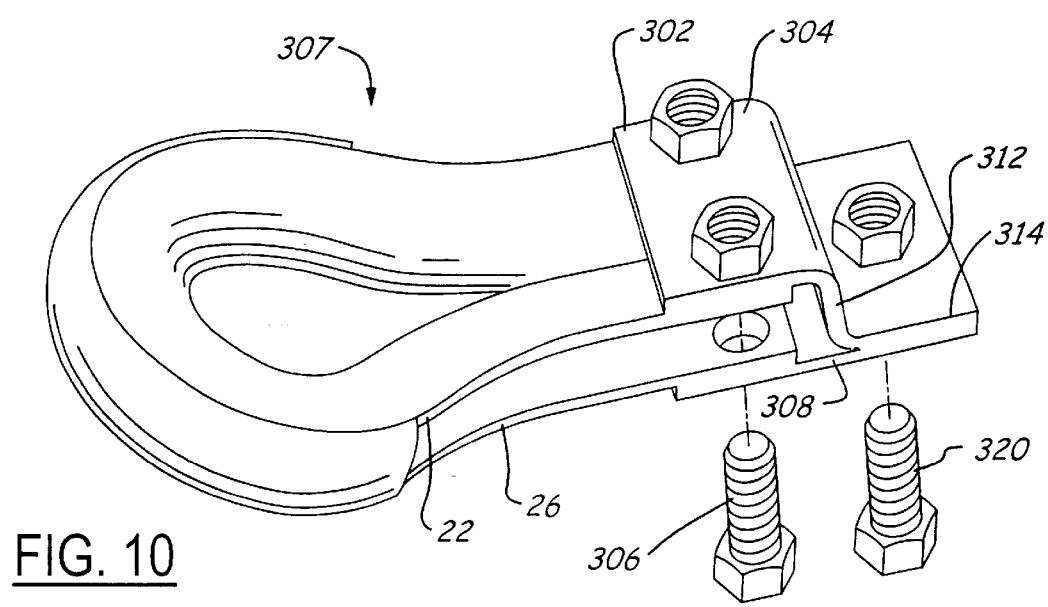

TOW HOOKS

The present invention claim priority to provisional application No. 60/251,645 Tow Hooks filed Dec. 6, 2000.

FIELD OF THE INVENTION

The present invention relates generally to load hooks used for pulling or lifting, and commonly referred to as tow hooks in vehicle applications. More particularly, the present invention relates to tow hooks which are attached to the front and/or rear end of automotive vehicles, especially light trucks, sport utility vehicles and small cars. The present invention also refers to hooks utilized on other vehicles such as in construction, military, agricultural and recreational applications as well as non-vehicular industrial/general purpose applications.

BACKGROUND OF THE INVENTION

Tow hooks are commonly connected to a front end of a first vehicle to allow the first vehicle to be pulled out by a second vehicle when the first vehicle is stuck. Tow hooks are also installed on the front and/or rear end of many smaller cars. Small cars are often built utilizing unibody construction wherein the car body provides part of the car frame. To prevent damage to the light chassis structure or car body by an improperly located/attached tow truck cable, there is provided a tow hook in an appropriately engineered location that allows the small car to be tied down for transport or towed in such a manner that the vehicle can withstand the pulling force exerted upon it by the tow truck. Most tow hooks are produced from relatively heavy metal castings, forgings or solid rod welded fabrications.

For the past three decades there has been a constant quest to increase fuel economy of automotive vehicles by lowering the weight of the vehicle. It is desirable to provide a tow hook which is sufficiently strong but lighter than tow hooks which have heretofore been available.

SUMMARY OF THE INVENTION

An embodiment of the present invention provides a design of a tow hook, which is strong but is extremely light in comparison with tow hooks previously available. In a preferred embodiment the tow hook of the present invention includes a first member formed from an elongated strip of metal into a generally U-shape with a closed hooked end having two extending arms. The first member has a cross-sectional shape with a base and two extending cross-sectional legs forming a generally U-shape with the legs extending outwardly. A second member is provided for a mounting bracket. The second member has a main body for connection with the automotive vehicle. Laterally connected to the second member main body are connected lateral flanges. The flanges are welded or fastener connected on upper and lower ends with the first member extending arms. A third member may be welded or fastener connected to the second member spanning over the second lateral flanges generally opposite the second member main body.

It is a feature of the of the present invention to provide a tow hook which has high strength and low weight characteristics.

The above noted and other features of the invention will become more apparent to those skilled in the art upon a reading of the following detailed description and upon reference to the drawings.

BRIEF DESCRIPTION OF THE DRAWINGS

FIG. 8 is an isometric view of the tow hook shown in FIG. 6.

FIG. 9 is a rear elevational view of the tow hook shown in FIG. 6.

FIG. 10 is a perspective view of an alternate preferred embodiment tow hook according to the present invention.

DETAILED DESCRIPTION OF THE INVENTION

Figure 1:
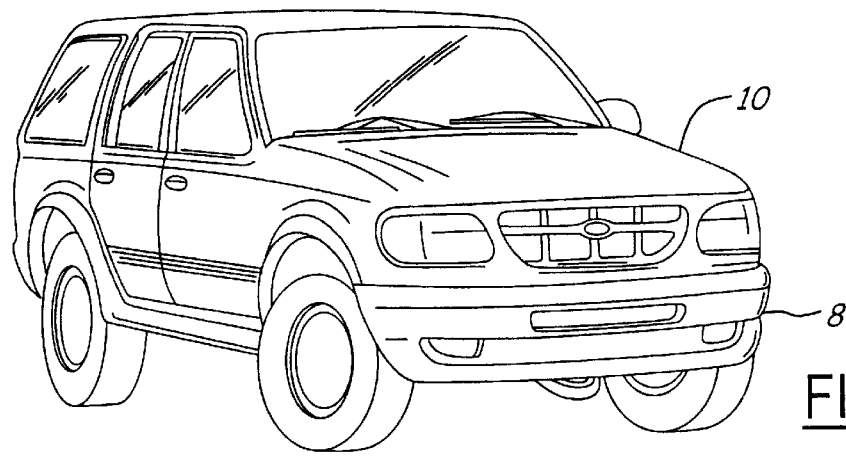
FIG. 1 is a perspective view of a sport utility vehicle which utilizes tow hooks built according to the present invention.
Figure 2:
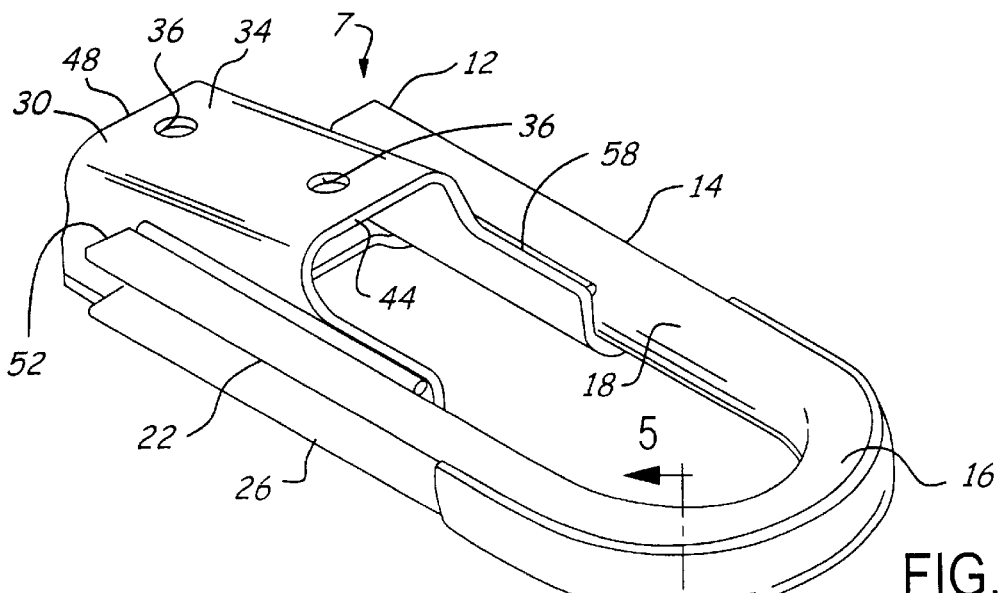
FIG. 2 is a perspective view of a preferred embodiment tow hook according to the present invention before assembly to a vehicle as shown in FIG. 1.

Referring to FIGS. 1, 2, 3 and 5, a tow hook 7 according to the present invention is provided. The tow hook is typically attached to a front end 8 of an automotive vehicle 10. The tow hook 7 has a first member 12. The first member 12 is formed from a flat stock plate or bar material of high strength steel having appropriate thickness and width to support the tow loads applied without incurring permanent deformation. In the example shown the bar has a thickness of 0.18 inches and is approximately 1½ inches wide. The high strength can be provided by medium or high carbon alloy steel which is subsequently hardened and tempered or by a micro alloy steel that has been properly conditioned to high strength levels. Depending upon the level of loading, the first member 12 can be of another formable material of adequate yield strength to resist the stress levels generated by loading.

As used herein, the term U-channel includes cross-sectional shapes with two extending legs such as C-channels or V-shaped channel members or channel members having a generally flat base with perpendicular extending legs. The first member 12 is formed into a generally U-shape along a first axial direction. The first member has two extending arms 14. At a closed or front end of first member 12 is a hooked end 16. The term "front" as used herein refers to an end of the first member which is hooked regardless of its orientation on the vehicle.

The first member 12 has a cross-sectional shape with a base 18. Joined to the base 18 are extending upper cross-sectional legs 22 and extending lower cross-sectional legs 26.

The tow hook 7 has a second member 30 that provides a mounting bracket for the tow hook 7. The second member 30 has a main body 34 provided to allow for connection to the vehicle 10. The main body 34 has an aperture 36 to allow for insertion of a threaded fastener. The main body 34 has an extreme forward edge 44 and an extreme rearward edge 48.

Figure 3:
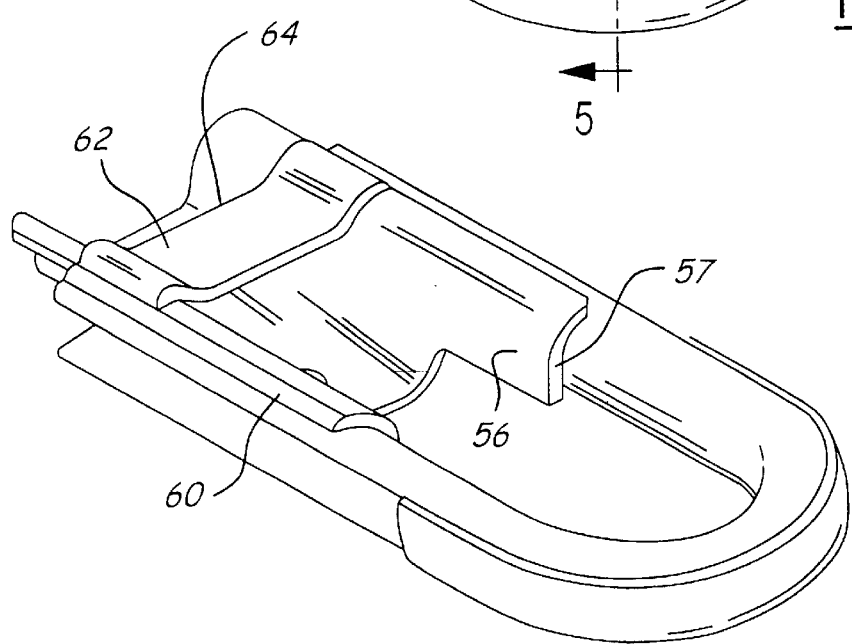
FIG. 3 is a perspective view of a bottom portion of a tow hook as shown in FIG. 2.

Turning to FIG. 3, connected to the second member main body 34 are two lateral flanges 56. The lateral flanges 56 may extend generally along the entire length of the second member 30. A front edge of the lateral flanges 56 extends forwardly from the extreme forward edge 44 of the main body 34. The main body 34 is raised with respect to the flanges 56 or the first member 12 and is accordingly higher than the lateral flanges 56 or the first member 12. Typically the main body 34 will be as shown in FIG. 2A, connected underneath the front cross frame of the vehicle 10. In such position the hooked end 16 of the first member 12 will extend forwardly. An extreme forward edge 57 of the flanges 56 extends toward the hooked end 16 of the first member forward of the extreme forward edge 44 of the main body.

The lateral flanges 56 are weldably connected on their upper end by longitudinal weld seams 58. A lower end of the lateral flanges is weldably connected by a weld seam 60 to the lateral flange 56. The rear extreme edge 48 of the second member 30 is somewhat vertically lower than the extreme edge 44 of the second member main body 34. The second member rearward extreme edge 48 is rearward the rearward extreme edge 52 of the first member 12.

The tow hook 7 may have a third member 62. The third member 62 has a rear end or edge 64 which is generally aligned with the rear edge 52 of the first member 12. The third member 62 is spaced from and bridges over (under in FIG. 2) the main body 34 of the second member. At its extreme edges or ends, the third member 62 is weldably connected to the flanges 56 of the second member 30. Both the second and third members 30, 62 can be formed from stamped metal material as similarly described in reference to the first member 12.

Figure 5:
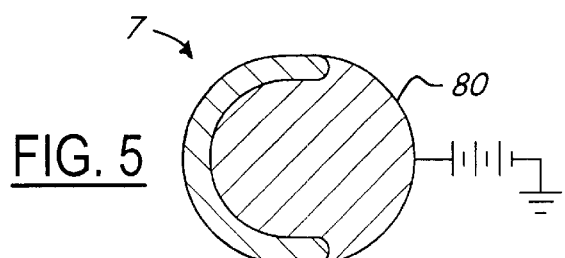
FIG. 5 is a view taken along line 5—5 of FIG. 2.
Figure 6:
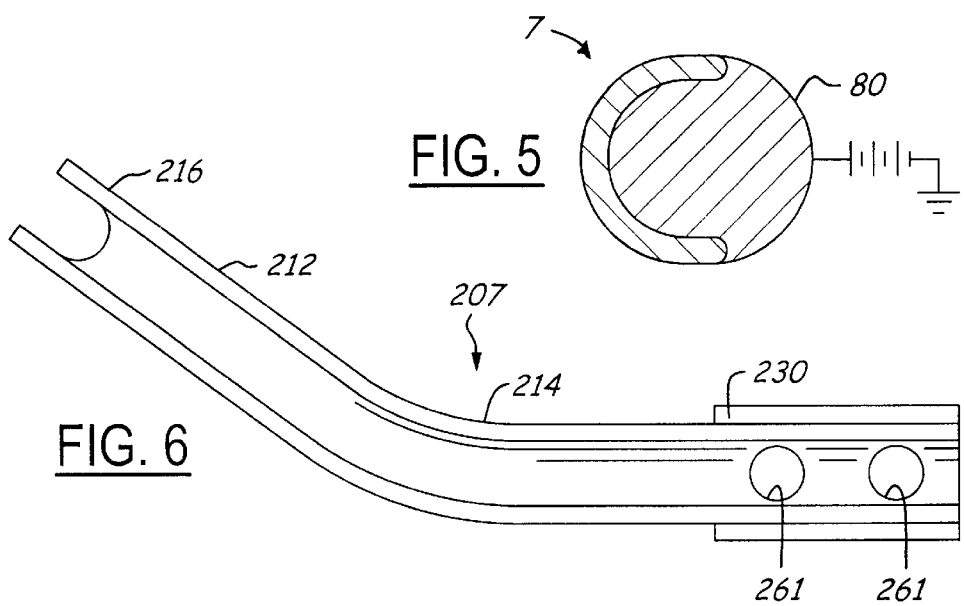
FIG. 6 is a top plane view of an alternate preferred embodiment tow hook according to the present invention.

As shown in FIG. 5, the first member, between the upper and lower extending cross-sectional legs 22, 26 adjacent the hooked end 16, has a filler insert member 80. The filler member 80 provides a more aesthetically pleasing appearance than the exposed inner surface of the U-channel cross-sectional shape of the first member. The filler member 80 can be color matched with the color of the vehicle for styling purposes. The filler member 80 may also be fluorescent. The filler member 80 prevents the area between the upper and lower extending cross-sectional legs 22, 26 from becoming filled with dirt, precipitation and debris. The filler member 80 may be press fitted, snap fitted, or adhesively joined to the hooked end 16 of the tow hook 7. The filler member 80 may also be coupled with the electrical system of the vehicle and therefore be light emitting. The light is provided for illuminating the position of the tow hook 7 and also for the aesthetics of the vehicle.

In operation, the tow hook 7 can be designed in a manner to plastically deform before an excessive force can be placed upon the tow hook 7 causing it to deform a vehicle frame structure that the tow hook 7 is connected to.

Figure 4:
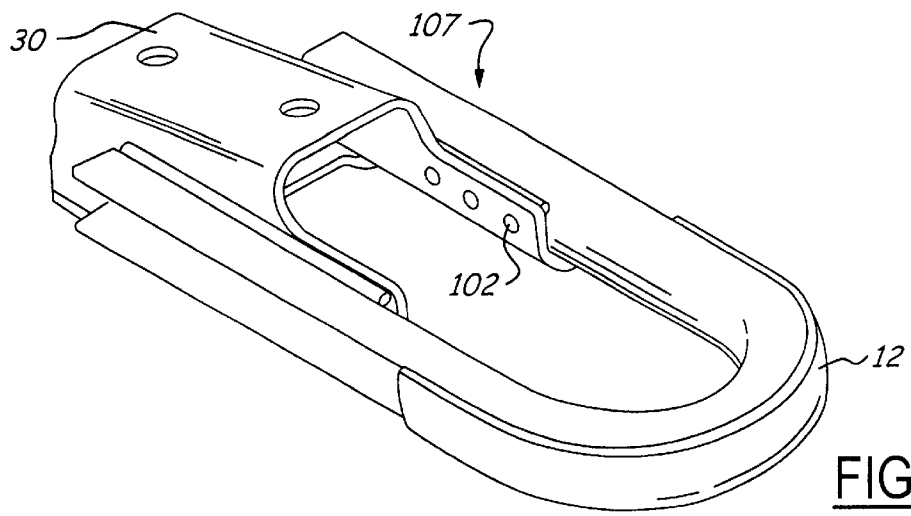
FIG. 4 is a view similar to that of FIG. 2 of an alternate preferred embodiment tow hook according to the present invention wherein first and second members of the tow hook are connected to one another by the utilization of fasteners.

Referring to FIG. 4 a tow hook 107 is provided wherein the second member 30 is joined to a first member 12 by a series of threaded fasteners 102.

Figure 7:
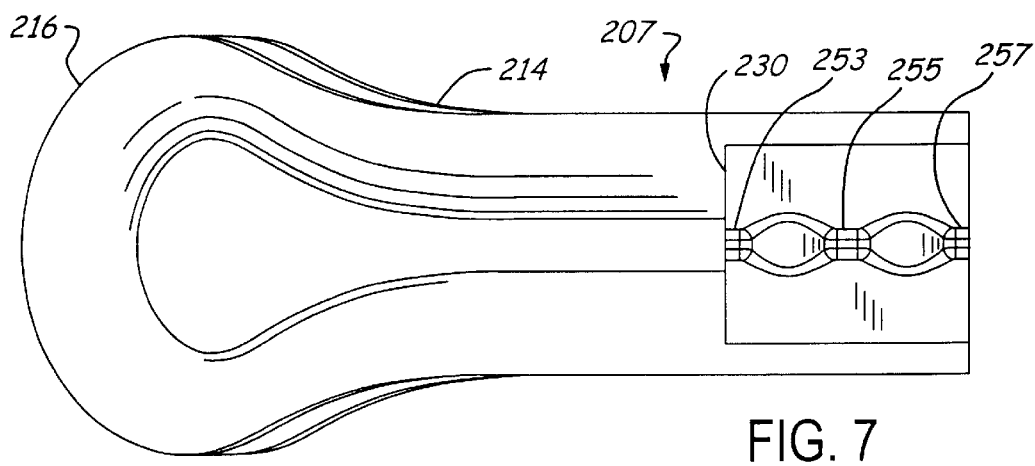
FIG. 7 is a front elevational view of the tow hook shown.

Referring to FIGS. 6, 7, 8 and 9, a tow hook 207 has a first member 212. The first member 212 has a curved portion 216 which is bent or curved away from its extending arms 214. Upper and lower (or left and right) second members 230 are provided. Each second member 230 has a connected flange 256. The second members have a main body portion 234 which is also joined to the flanges 256. The main body portions 234 are weldably connected to each other at positions 253, 255 and 257 as best shown in FIGS. 7 and 9.

The first members 212 have extending legs 222 and 226. The material for the first members 212 and the second members 230 can be similar to that as previously described for tow hook 7, shown in FIGS. 2 and 3 and tow hook 107 shown in FIG. 4.

The tow hook 207 is attached to the vehicle by fasteners (not shown) which penetrate through apertures 261. Apertures 261 penetrate the first member 214, as well as the main body portion 234 of the second members.

In FIG. 10 a second member 302 has a upper portion 304 joined to the legs 22 of the hook 307 by fasteners (bolts 306) which extend though the legs 22. The bolts 306 commonly connect a third member 308 with the first member through legs 26. The second member has a slant portion 312 which is connected to a flat portion 314. The flat portion 314 independently connected with the third member 308 by a bolt 320. All three bolts 306, 320 are used to connect the hook 307 with the vehicle.

While the invention has been described in connection with preferred embodiments, it will be understood that it is not intended to limit the invention to those particular embodiments. On the contrary it is endeavored to cover all alternatives, modifications and equivalents as may be included within the spirit and scope of the invention as encompassed by the description and as defined by the appended claims.

I claim:

1. A lightweight high-strength tow hook, comprising:
   a first member being an elongated strip of metal formed generally into a U-shape having first and second arms extending along a first axial direction, said first member having a cross-sectional shape with a base and a first extending cross-sectional leg; and
   a second member forming a mounting bracket having a main body for connection with an automotive vehicle, said second member having connected to said main body two lateral flanges, said lateral flanges being connected with said first member extending arms.

2. A tow hook as described in claim 1, wherein said first member cross-sectional shape has a second extending cross-sectional leg forming a channel.

3. A tow hook as described in claim 2, wherein said first member has a filler member inserted between said first and second extending cross-sectional legs of said first member along a hook mend of said first member.

4. A tow hook as described in claim 3, wherein said filler member is illuminated.

5. A tow hook as described in claim 3, wherein said filler member is fluorescent.

6. A tow hook as described in claim 1, further including a third member bridging over a space between said first and second extending arms of said first member spaced away from said main body of said second member.

7. A tow hook as described in claim 6, wherein said third member is connected at extreme opposite ends with said flanges of said second member.

8. A tow hook as described in claim 6, wherein said third member rear edge is aligned with the rear edge of said first member.

9. A tow hook as described in claim 1, wherein said first member and second member are welded together.

10. A tow hook as described in claim 1, wherein said first and second members are connected together by fasteners.

11. A tow hook as described in claim 7, wherein said first and second members are connected on a top side and bottom side of said second member flanges.

12. A tow hook as described in claim 1, wherein said lateral flanges extend toward a hooked end of said first member beyond an extreme forward edge of said second member main body.

13. A tow hook as described in claim 1, wherein said second member main body is raised with respect to said first member.

14. A lightweight high-strength tow hook, comprising:
   a first member formed from an elongated strip of metal into a generally U-shape having arms extending along a first axial direction, said first member having a U-shaped cross-section with a base and two extending cross-sectional legs, said legs extending outwardly; and a second member providing a mounting bracket, said second member having a main body for connection with an automotive vehicle, said second member having two lateral flanges connected with said main body, said connected flanges being welded on upper and lower ends with said first member extending arms.

15. A tow hook as described in claim 14, further including a third member spaced from and spanning over said main body of said second member and being connected with said flanges of said second member.

16. A tow hook as described in claim 14, wherein said flanges extend toward a hooked end of said first member beyond an extreme forward edge of said second member main body.

17. A tow hook as described in claim 15, wherein said second member main body is raised from said second member flanges and said first member.

18. A tow hook as described in claim 14, wherein a rear extreme edge of said second member extends further rearward than a rear extreme edge of said first member.

19. A lightweight high strength tow hook, comprising:

a first member formed from an elongated strip of metal or other material into a generally U-shape with two arms extending along a first axial direction, said first member having a cross-sectional shape with a base and two outwardly-extending cross-sectional legs generally forming a U-shape;

a second member providing a mounting bracket, said second member having a main body raised from said first member for connection with an automotive vehicle, said second member having two lateral flanges connected with said main body, said flanges extending forwardly towards a closed hook end of said first member from an extreme edge of said main body and said lateral flanges being welded on upper and lower ends with said first member and said second member having a rearward extreme edge extending beyond a rearward extreme edge of said first member; and a third member having a rearward extreme edge aligned with a rearward extreme edge of said first member, said third member expanding over said lateral flanges of said second member generally opposite said second member main body and being weldably connected thereto.

20. A tow hook as described in claim 19, wherein said second member has an aperture which is penetrated by a fastener to connect said tow hook to said vehicle and said aperture for said fastener also penetrates through said first member.

21. A tow hook as described in claim 20, wherein said first member cross-sectional shape has a second extending cross-sectional leg forming a channel.

22. A tow hook as described in claim 21, further including a second member connected with said first member opposite said first second member and said first and second members being connected with one another.

23. A tow hook as described in claim 19, wherein the curved portion of the first member is oriented in a different plane than that of the extending arms.

24. A lightweight high strength tow hook, comprising:

a first member being an elongated strip of metal formed generally into a U-shape having first and second arms extending along a first axial direction, said first member having a cross-sectional shape with a base and first and second extending cross-sectional legs; and two second members forming a mounting bracket, each second member having a main body for connection with an automotive vehicle, said second members having a main body connected to lateral flanges, said lateral flanges being connected with said first member extending arms, and wherein said second members are connected with one another opposite each other and said second members having a penetrating aperture which penetrates said base of said first member and both of said second members to allow for a fastener to pass therethrough to connect said tow hook with a vehicle.

25. A lightweight high-strength tow hook, comprising:

a first member being an elongated strip of metal formed generally into a U-shape with first and second arms extending generally along a first axial direction, said first member having a cross-sectional shape with a base and a first extending cross-sectional leg; and a second member forming a mounting bracket having a body for connection with an automotive vehicle, said second member being fastener connected to said first member leg.

26. A fastener as described in claim 25 wherein said first member cross-sectional shape has a second extending cross-sectional leg forming a channel and a third member is connected with said first and second members via a common fastener extending through said legs.

27. A fastener as described in claim 26 wherein said second and third members are additionally connected together independent of any connection with said first member.

28. A fastener as described in claim 27 wherein said second member ramps over to said third member.

29. A lightweight high-strength tow hook, comprising:

a first member being an elongated strip of metal formed generally into a U-shape with first and second arms extending along a first axial direction, said first member having a cross-sectional shape with a base and outward extending cross-sectional legs; and a second member forming a bracket for connection with an automotive vehicle, said second member being connected with a fastener to said first member arms through one leg of the first member, and a third member connected to said other leg of said first member by fasteners common with said fasteners connecting said first and second members together, and said third member being connected to said second member independent of any connection of said third member with said first member.

* * * * *

UNITED STATES PATENT AND TRADEMARK OFFICE
CERTIFICATE OF CORRECTION

PATENT NO.    : 6,672,609 B2
DATED         : January 6, 2004
INVENTOR(S)   : Pierman et al.

It is certified that error appears in the above-identified patent and that said Letters Patent is hereby corrected as shown below:

<u>Column 4,</u>
Line 36, "mend" should be -- end --

Signed and Sealed this

Twenty-fourth Day of February, 2004

JON W. DUDAS
*Acting Director of the United States Patent and Trademark Office*